United States Patent
Urata et al.

(10) Patent No.: US 9,768,662 B2
(45) Date of Patent: Sep. 19, 2017

(54) WATER-COOLED MOTOR STRUCTURE AND WATER-COOLED HOUSING

(71) Applicant: Shaft Inc., Koto-Ku, Toyko (JP)

(72) Inventors: Junichi Urata, Tokyo (JP); Yuto Nakanishi, Tokyo (JP)

(73) Assignee: Schaft Inc., Tokyo (JP)

( * ) Notice: Subject to any disclaimer, the term of this patent is extended or adjusted under 35 U.S.C. 154(b) by 224 days.

(21) Appl. No.: 14/432,904

(22) PCT Filed: Sep. 30, 2013

(86) PCT No.: PCT/JP2013/076530
§ 371 (c)(1),
(2) Date: Apr. 1, 2015

(87) PCT Pub. No.: WO2014/054577
PCT Pub. Date: Apr. 10, 2014

(65) Prior Publication Data
US 2015/0263583 A1    Sep. 17, 2015

(30) Foreign Application Priority Data
Oct. 3, 2012  (JP) .................................. 2012-221082

(51) Int. Cl.
*H02K 9/00* (2006.01)
*H02K 5/20* (2006.01)

(52) U.S. Cl.
CPC ........ *H02K 5/20* (2013.01); *H02K 9/00* (2013.01)

(58) Field of Classification Search
USPC ........................................ 310/52, 54, 58, 59
See application file for complete search history.

(56) References Cited

U.S. PATENT DOCUMENTS 2,774,543 A * 12/1956 Keller ..................... B02C 13/26
                                                        241/138
4,818,906 A *  4/1989 Kitamura ................. H02K 9/19
                                                         310/54
(Continued)

FOREIGN PATENT DOCUMENTS

CN        201290050         8/2009
CN        201937382         8/2011
(Continued)

OTHER PUBLICATIONS

International Preliminary Report on Patentability and Written Opinion prepared by the Japanese Patent Office in international patent application serial No. PCT/JP2013/076530, mailed Apr. 16, 20156.
(Continued)

*Primary Examiner* — Thanh Lam
(74) *Attorney, Agent, or Firm* — McDonnell Boehnen Hulbert & Berghoff LLP

(57) ABSTRACT

A water-cooled housing (100) comprises: a tubular passage section (20) which has a plurality of partition walls erected in the direction of the central axis at a prescribed angular interval on a substantially cylindrical inner wall to form a plurality of outward passages and a plurality of inward passages extending parallel to each other along the central axis between the plurality of partition walls and the outer peripheral surface of a motor (40); a first cover section (10) which closes a first opening of the tubular passage section (20) while having a plurality of returning passages that connects inward passages to next outward passages; a second cover section (30) which closes a second opening of the tubular passage section (20) while having a plurality of returning passages that connects outward passages to next inward passages; a water supply section (16a) which is provided on the first cover section (10) and connected to the entrance of a first outward passage; and a water drain section
(Continued)

(17a) which is connected to the outlet of the last inward passage of the first cover section (10) or is connected to the outlet of the last outward passage of the second cover section (30). With such a configuration, the present invention provides a water-cooled motor structure and a water-cooled housing which allow for easy production of components and increased cooling efficiency.

20 Claims, 14 Drawing Sheets

(56) References Cited

U.S. PATENT DOCUMENTS

| | | | | |
|---|---|---|---|---|
| 6,300,693 | B1* | 10/2001 | Poag | H02K 5/20 310/54 |
| 2002/0067086 | A1 | 6/2002 | Kikuchi et al. | |
| 2006/0066159 | A1 | 3/2006 | Enomoto et al. | |
| 2007/0176499 | A1* | 8/2007 | Holmes | H02K 9/19 310/54 |
| 2010/0007227 | A1 | 1/2010 | Smith et al. | |

FOREIGN PATENT DOCUMENTS

| | | |
|---|---|---|
| CN | 202076876 | 12/2011 |
| EP | 1 049 235 | 11/2001 |
| FR | 2 912 695 | 8/2008 |
| JP | 01-136540 | 5/1989 |
| JP | 05-88185 | 4/1993 |
| JP | 10-225060 | 8/1998 |
| JP | 2002-371995 | 12/2002 |
| JP | 2007-143246 | 6/2007 |
| WO | WO 03/100946 | 12/2003 |

OTHER PUBLICATIONS

Supplementary European Search Report prepared by the European Patent Office in application No. EP 13 84 3695, mailed Apr. 29, 2016.

International Preliminary Report on Patentability and Written Opinion prepared by the Japanese Patent Office in international patent application serial No. PCT/JP2013/076530, mailed Apr. 16, 2015.

International Search Report prepared by the Japanese Patent Office in international patent application serial No. PCT/JP2013/076530, mailed Dec. 17, 2013.

* cited by examiner (a)

(b)

(a)  (b)

(c)

(a)　　　　　　　　　　　(b)

(c)

(a)

(b)

(c)

WATER-COOLED MOTOR STRUCTURE AND WATER-COOLED HOUSING

TECHNICAL FIELD

The present disclosure relates to a water-cooled motor structure and a water-cooled housing that are readily produced and that have a high capability for cooling.

BACKGROUND

In a small and high-power motor (an electric motor), heat generation when it is in operation is disregarded, and sometimes a malfunction such as a burned-out winding of the motor occurs.

Conventionally, as a water-cooled structure for a motor, suggested is a cooling system for an electric motor in which a passage for cooling water is provided in a space between an inner cylinder and an outer cylinder of a cylindrical frame for which a stator and a rotator are fitted therein (Patent Literature 1). This system includes a configuration in which a plurality of partition walls is provided on the passage for the cooling water along the axial direction of the cylindrical frame such that the cooling water supplied from an inlet conduit for the cooling water is guided to an outlet conduit for the cooling water, while the direction of the flow of the cooling water is alternately changed between the side of one end and the side of the other end of the cylindrical frame. Similar configurations are disclosed in Patent Literature 2 and 3.

PRIOR-ART DOCUMENTS

Patent Literature

Patent Literature 1: Japanese Patent Laid-open Publication No. 1[1989]-136540
Patent Literature 2: Japanese Utility Model Laid-open Publication No. 5 [1993]-88185
Patent Literature 3: Japanese Patent Laid-open Publication No. 2007-143246

SUMMARY OF THE INVENTION

The Problem to be Solved by the Invention

In the above prior art, to achieve the configuration in which the cooling water supplied from an inlet conduit for the cooling water is guided to an outlet conduit for the cooling water, while the direction of the flow of the cooling water is alternately changed between the side of one end and the side of the other end of the cylindrical frame, the partition walls that extend along the axial direction to partition the space between the inner cylinder and the outer cylinder is configured such that they are alternately retracted between the side of one end and the side of the other end of the frame. With such a configuration, the retracted portions of the partition walls at the one end and the other end of the cylindrical frame act as return passages for returning the cooling water.

In addition, the cylindrical frame has a structure in which the inner cylinder, the outer cylinder, and the partition walls that partition the space therebetween are integrated. In the system disclosed in Patent Literature 2 and 3, such a frame structure is formed by a casting using a mold.

In the above conventional water-cooled motor structure, because the frame of the motor should be a specialized structure, there is an inconvenience in that it cannot be applied to a conventional motor.

Further, in the structure of the frame of the motor, the shape of the cross section of the passage for the cooling water is not uniform. So it is difficult to produce such a structure by a manufacturing process such as a cutting operation or extrusion.

The present invention is made considering the above situation. An object of it is to provide a water-cooled motor structure and a water-cooled housing for which the components can be readily manufactured, and wherein the cooling performance is very efficient.

The Means to Solve the Problem

The water-cooled motor structure of the present invention comprises a water-cooled housing for containing a motor such that cooled water flows through the water-cooled housing to cool the motor. The water-cooled housing comprises a tubular passage section that has a plurality of partition walls erected in the direction of the central axis at prescribed angular intervals on a substantially cylindrical inner wall to form a plurality of outward passages and a plurality of inward passages extending parallel to each other along the central axis between the plurality of partition walls and the outer peripheral surface of the motor, a first cover section, which closes a first opening of the tubular passage section while having a plurality of return passages that connects inward passages to the following outward passages, a second cover section, which closes a second opening of the tubular passage section and has a plurality of return passages that connects outward passages to the following inward passages, a water supply section that is provided on the first cover section and connected to the entrance of a first outward passage, and a water drain section that is connected to the outlet of the last inward passage of the first cover section or is connected to the outlet of the last outward passage of the second cover section.

Each passage of the plurality of the outward passages and the plurality of the inward passages consists of an inner wall of the tubular passage section, the partition wall, and a peripheral surface (an outer wall) of the motor.

The shape of the cross section of the inner wall of the tubular passage section is typically uniform at any point between the one end and the other end in the axial direction.

Each of the return passages that are provided on the first cover section and the second cover section consists of a cavity. It connects two adjacent passages of the tubular passage section that has the interior of the corresponding cover section. Namely, a connection between the adjacent outward passage and the inward passage is achieved by the return passages, which are provided with the first cover section and the second cover section.

The first cover section can be provided with the water supply section configured for receiving supplies and cooling-water from the exterior. The supplied cooling-water flows into the water-cooled housing. The water drain section is configured for externally draining the cooling water through the water-cooled housing. Alternatively, while the first cover section can be provided with the water supply section configured for receiving supplies and cooling water from the exterior, the supplied cooling-water flows into the water-cooled housing. And the second cover section can be provided by the water drain section configured for externally draining the cooling water through the water-cooled housing.

The water-cooled housing may include a first space corresponding to a first motor and a second space corresponding to a second motor such that the first space and the second space are connected in parallel to each other. The first space and the second space share a pair of the water supply section and the water drain section. The cooling-water supplied to the water supply section flows into a plurality of passages of the first space and then flows into a plurality of passages of the second space, and is drained from the water drain section.

The water-cooled housing of the present invention contains a motor such that cooling water cools the motor. The water-cooled housing comprises a tubular passage section, which has a plurality of partition walls erected in the direction of the central axis at prescribed angular intervals on a substantially cylindrical inner wall to form a plurality of outward passages and a plurality of inward passages extending parallel to each other along the central axis between the plurality of partition walls and the outer peripheral surface of the motor, a first cover section, which closes a first opening of the tubular passage section while having a plurality of return passages that connects inward passages to the following outward passages, a second cover section, which closes a second opening of the tubular passage section while having a plurality of return passages that connects outward passages to the following inward passages, a water supply section that is provided on the first cover section and connected to the entrance of the first outward passage, and a water drain section that is connected to the outlet of the last inward passage of the first cover section or is connected to the outlet of the last outward passage of the second cover section.

The Advantage of the Invention

The present invention provides a water-cooled motor structure whose components can be readily manufactured. And the water-cooled motor structure and a water-cooled housing have a high efficiency of cooling.

THE EMBODIMENT TO CARRY OUT THE INVENTION

Below the preferred embodiment of the present invention will be described in detail in reference to the drawings.

Figure 1:
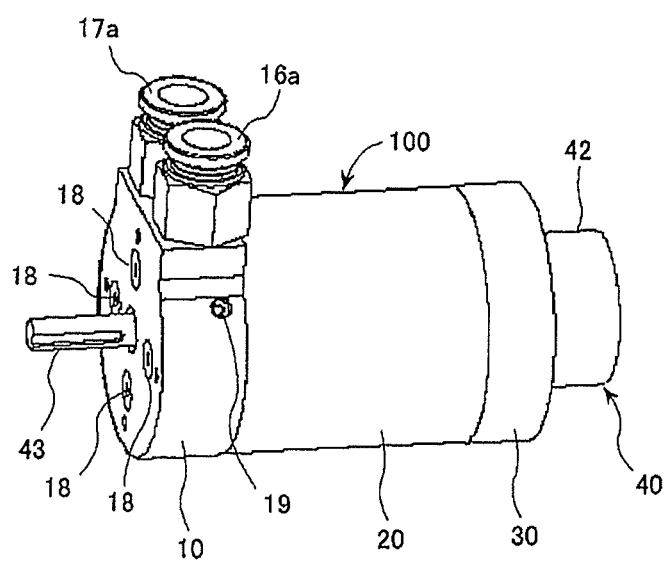
FIG. 1 is a perspective view of the motor water-cooled structure of the embodiment of the present invention.
Figure 2:
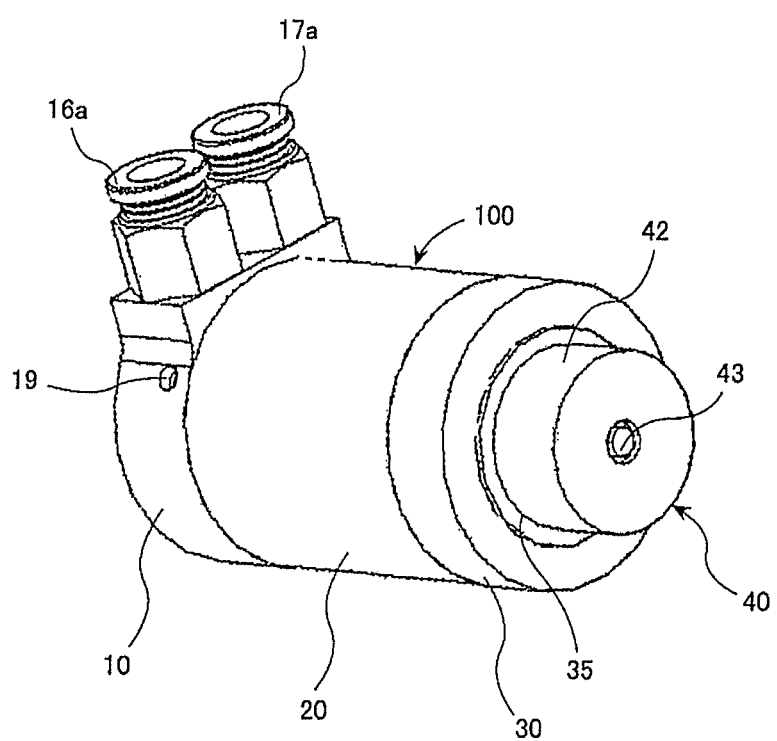
FIG. 2 is another perspective view of the motor water-cooled structure of the embodiment of the present invention, in a view from an angle different from that of FIG. 1.

FIGS. 1 and 2 are perspective views of the water-cooled motor structure of the embodiment of the present invention in a view from different angles.

The water-cooled motor structure contains a motor 40 in a water-cooled housing 100. In FIGS. 1 and 2, the rotary shaft 43 of the motor 40 and an end cover 42 are visibly exposed from the housing 100. The housing 100, broadly described, comprises a centered tubular passage section 20, and a first cover section 10, and a second cover section 30, that are coupled to both ends of the tubular passage section. The tubular passage section 20, the first cover section 10, and the second cover section 30, can all be produced from any materials having rigidity, such as a metal, a polymer, or ceramic.

The tubular passage section 20 has a shape substantially like a cylinder. The inner wall of the substantially cylindrical body is provided with a plurality of partition walls erected in the direction of the central axial at prescribed angular intervals to form a plurality of outward passages and a plurality of inward passages extending parallel to each other along the central axis of the cylindrical body between the plurality of partition walls and the outer peripheral surface of the motor. As used herein, the term "outward passage" refers to a passage wherein cooling water flows from the side of the cover section that has a water-supply conduit as described below, in the direction toward the other cover section. A passage wherein the cooling water flows in the opposite direction refers to the "inward passage." These passages can also be interpreted as being a plurality of concave slots that are formed in the inner wall of the cylindrical body that extend parallel to each other along the central axis of the cylindrical body.

The first cover section 10 blocks a first opening of the tubular passage section 20 and has a plurality of return passages that connects the inward passages to the following outward passages. In this embodiment, the first cover section 10 is provided with the water-supply conduit 16a (the water supply section) to receive the cooling water (liquid) from the exterior and to supply it to the tubular passage section 20, and a drainage conduit 17a (a water drain section) to externally drain the cooling water that flows through the tubular passage section 20.

The water-supply conduit 16a is provided with the first cover section 10 and is connected to the entrance of the first outward passage of the plurality of passages of the tubular passage section 20.

The drainage conduit 17a is connected to an outlet of the last inward passage of the first cover section 10. Alternatively, the drainage conduit 17a may be provided with the second cover section 30 such that the drainage conduit 17a is connected to an outlet of the last outward passage of the second cover section 30 (such an arrangement is not shown).

The second cover section 30 has a shape that is substantially like a doughnut. In the second cover section, the shaft 43 and the cover 42 of the motor 40 are projected from an opening 35 (see FIG. 2) to block a second opening of the tubular passage section 20, and a plurality of return passages are provided for connecting the outward passage of the tubular passage section to the following inward passage over the entire inside peripheral edge of the second opening.

In addition, a wire (a cable) to supply power to the motor 40 is, but is not so limited, to one externally derived from the end cover 42.

Figure 3:
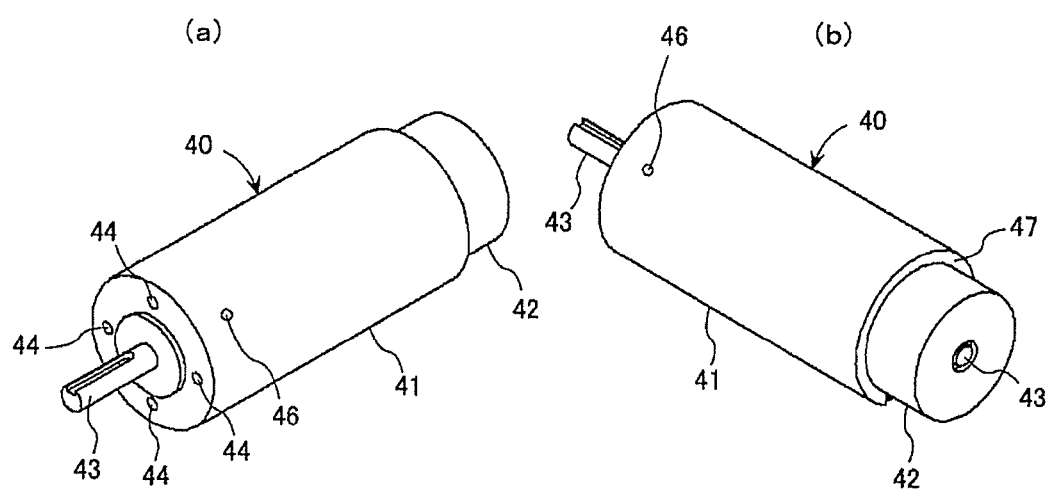
FIG. 3 illustrates an example of the appearance of the motor of the embodiment of the present invention.

FIG. 3 shows an example of the appearance of the motor 40. The housing 100 is configured to adapt the external profile of the motor 40. The rotary shaft 43 projects from one end of the substantially cylindrical motor 40. The plane in which the shaft 43 is projected is provided with a plurality (in this example, four) of threaded holes 44. As shown in FIG. 1, the first cover section 10 is fixed to the motor 40 by threading threads (not shown) into the threaded holes 44 of the motor 40 through threaded holes 18 that are provided on an outer plane of the first cover section 10. Also, the curved side surface of the cover section 10 is provided with a threaded hole 19. Through the threaded hole 19, a thread is threaded into a threaded hole 46 that is provided on the outer periphery of the motor 40. The fixing of the cover section 10 to the motor 40 with the threads described herein is intended to illustrate just one example of a fixing means of the present invention, and is not intended to be a limitation. The end cover 42 is fixed such that one end thereof abuts an end 47 of the motor 40.

Figure 4:
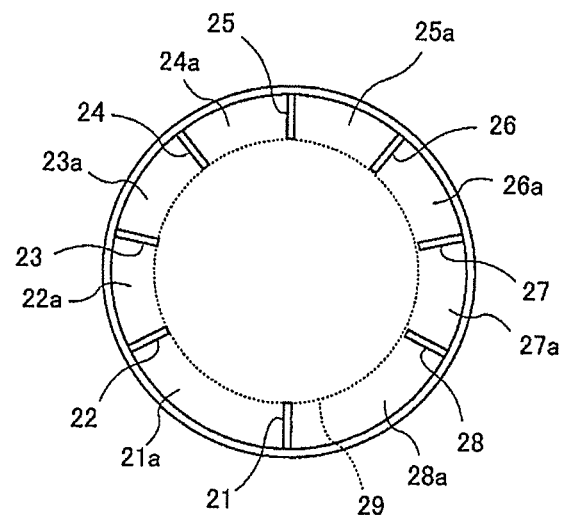
FIG. 4 shows a front view of the tubular passage section of the embodiment of the present invention in a view from the axial direction and a perspective view of it in a view slanted from the outside.
Figure 4:
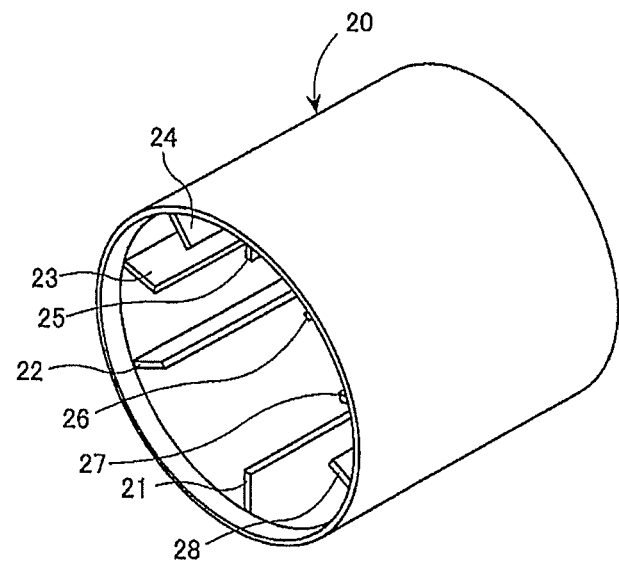

FIGS. 4 (a) and (b) show a front view of the tubular passage section 20 in a view from the axial direction and a perspective view of it in a view from an outward angle.

As will be appreciated from these figures, the tubular passage section 20 is provided with the plurality of partition walls 21-28 that are elongated along the axial direction and erected in the direction of the central axis of the cylindrical body at the prescribed angular interval on the inner wall of the cylindrical body. As shown in FIG. 4, a dashed-line circle 29 illustrates a cylindrical space corresponding to the outer peripheral profile of the motor 40. When the motor 40 is contained in the tubular passage section, free ends of the partition walls 40 are configured such that they abut the outer peripheral surface of the motor 40. With this configuration, the substantially cylindrical inner wall of the tubular passage section 20, the partition walls 21-28, and the outer wall (the outer peripheral surface) of the motor 40 form a plurality (in this example, eight) of passages 21a-28a. The respective partition walls 21-28 have the same sizes and the same plate-like shapes. To evenly cool the outer peripheral surface of the motor 40, preferably the thickness of each of the partition walls that separate the adjacent passages is as thin as possible. Basically, the cooling water can evenly and stably flow in the respective passages by having the sizes of the passages 21-28, i.e., cross sections or angles at the circumference, be uniform.

In this embodiment, however, temperature sensors (not shown) are positioned within the passage 21 that communicates with the water-supply conduit 16a of the housing 100 and the passage 28 that communicates with the drainage conduit 17a such that the cross sections of both passages are greater than those of the remaining passages in consideration of the respective flow resistances of these sensors. One of the two temperature sensors is a backup sensor.

Figure 5:
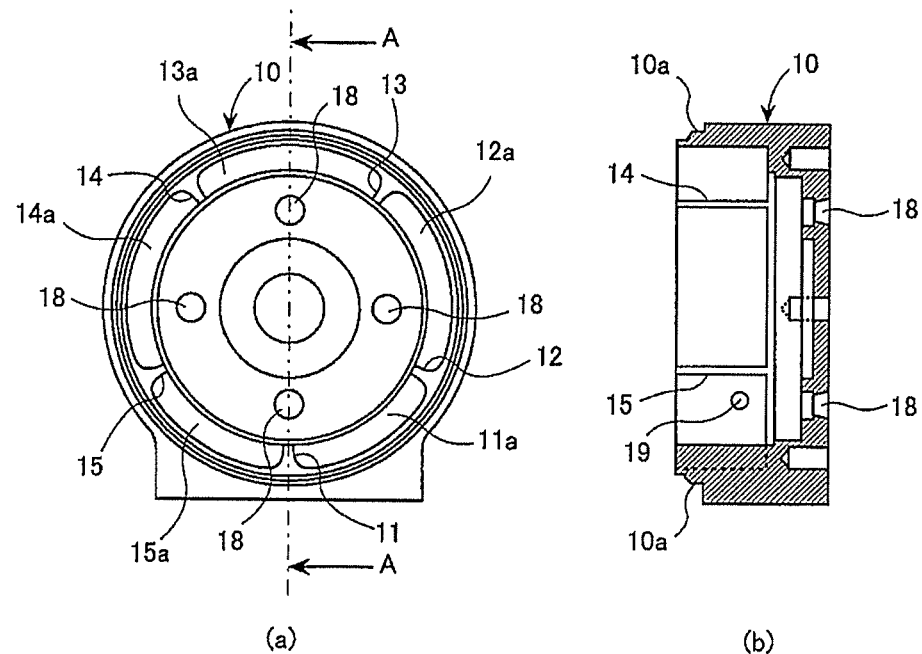
FIG. 5 shows a front view of the first cover section of the embodiment of the present invention in a view from the axial and inner direction, a cross-sectional view along arrows A-A therein, and a perspective view of it in a view from an inward angle.

FIGS. 5 (a), (b), and (c) show a front view of the first cover section 10 in a view from the axial and inner direction, a cross-sectional view along arrows A-A therein, and a perspective view of it in a view from an inward angle. It should be noted that these figures are shown upside down in relation to FIG. 1.

The first cover section 10 is joined in one end of the tubular passage section 20 so as to cover the opening of that one end of the tubular passage section 20. Namely, the cylindrical end of the tubular passage section 20 is fitted and joined to a shoulder 10a, which is formed on the end of the cover section 10, while the rotational angles of the cylindrical end and the shoulder 10a are aligned with each other. In this embodiment, such a joining is achieved using a water-resistant adhesive. But it is not limited to that adhesive. The method of joining can utilize any conventional means. Maintaining the water tightness may be done by using an elastic packing and the like.

The side of the cover section 10 is provided with a water-supply inlet port 16 that is to be coupled to the water-supply conduit 16a and a water-drain outlet port 17 that is being coupled to the drainage conduit 17a.

In addition, the cover section 10 is provided with partition walls 11, 12, 13, 14, and 15, corresponding to the partition walls 21, 22, 24, 26, and 28 of the tubular passage section 20, respectively. These partition walls 11-15 are erected on the inner wall of the ring-like cavity of the cover section 10 along the central axis direction at prescribed angular intervals. When the motor is contained in the housing 100, the free ends of the partition walls 11-15 are configured such that they abut the outer peripheral surface of the motor 40. In the cover section 10, a water-supply chamber 11a is formed between the partition wall 11 and the partition wall 12. The water-supply inlet port 16 opens outwardly from the water-supply chamber 11a. The water-supply chamber 11a corresponds to the first passage 21a of the tubular passage section 20, to guide the cooling water supplied from the water-supply conduit 16a to the passage 21. The water-supply chamber 11a also constitutes a part of all of the passages of the water-cooled housing 100.

A return passage 12a is formed between the partition wall 12 and the partition wall 13. The "return passage" consists of a cavity that connects the two adjacent passages to each other of the tubular passage section 20 that is provided inside the cover section 10. The return passage 12a opposes the passages 22a and 23a of the tubular passage section 20 such that the return passage 12a returns and guides the cooling water flowing from the passage 22a to the passage 23a.

A return passage 13a is formed between the partition wall 13 and the partition wall 14. The return passage 13a opposes the passages 24a and 25a of the tubular passage section 20 such that the return passage 13a returns and guides the cooling water flowing from the passage 24a to the passage 25a.

A drainage chamber 15a is formed between the partition wall 15 and the partition wall 11. The water-drain outlet port 17 opens outwardly from the drainage chamber 15a. The drainage chamber 15a also constitutes a part of all the passages of the water-cooled housing 100.

Figure 6:
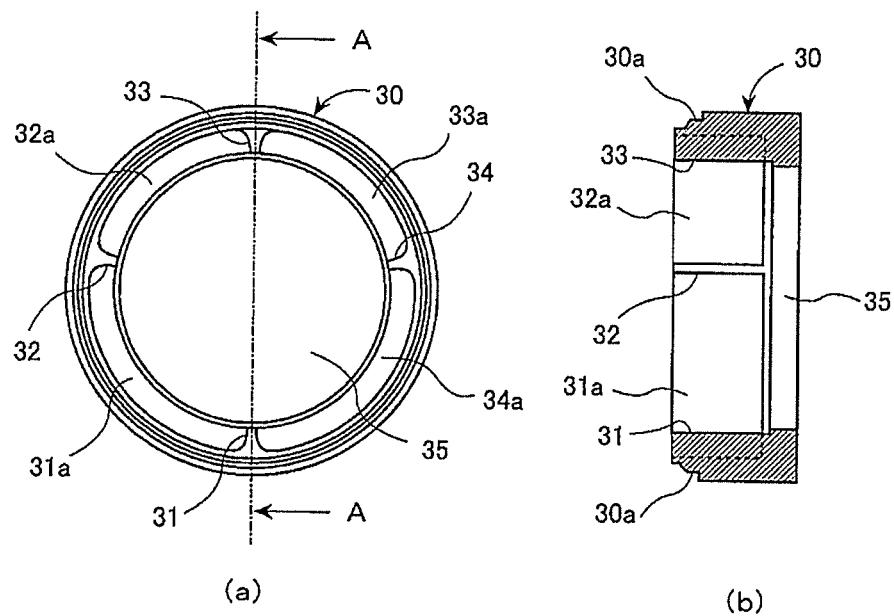
FIG. 6 shows a front view of the second cover section of the embodiment of the present invention in a view from the axial and inner direction, a cross-sectional view along arrows A-A therein, and a perspective view of it in a view from an inward angle.
Figure 6:
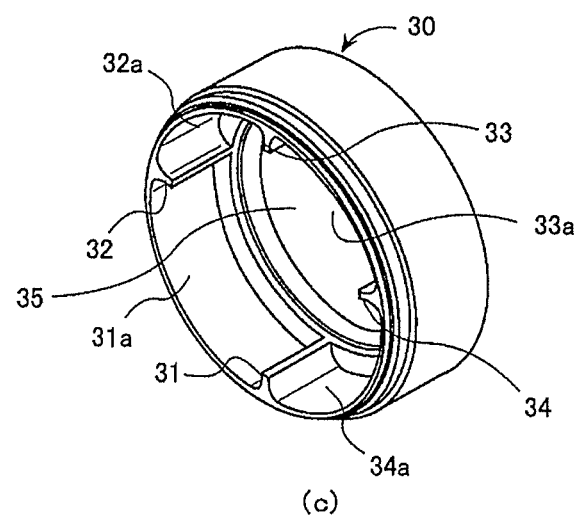

FIGS. 6(a), (b), and (c) show a front view of the second cover section 30 in a view from the axial and inner direction, a cross-sectional view along arrows A-A therein, and a perspective view of it in a view from an inward angle.

The second cover section 30 is joined with the tubular passage section 20 to cover the opening of the other end of the tubular passage section 20. Namely, the cylindrical end of the tubular passage section 20 is fitted and joined to a shoulder 30a, which is formed on the end of the cover section 30, while the rotational angles of the other cylindrical end and the shoulder 30a are aligned with each other. In this embodiment, such a joining is achieved using a water-resistant adhesive. The method of the joining can utilize any conventional means, and is not limited to the adhesive. Maintaining the water tightness may be carried out using an elastic packing and the like.

In addition, the cover section 30 is provided with partition walls 31, 32, 33, and 34, corresponding to the partition walls 21, 23, 25, and 27 of the tubular passage section 20, respectively. These partition walls 31-34 are erected on the inner wall of the ring-like cavity of the cover section 30 along the central axis direction at prescribed angular intervals. When the motor is contained in the housing 100, the free ends of the partition walls 31-34 are configured so that they abut the outer peripheral surface of the motor 40.

In the cover section 30, a return passage 31a is formed between the partition wall 31 and the partition wall 32. The return passage 31a opposes the passages 21a and 22a of the tubular passage section 20 such that the return passage 31a returns and guides the cooling water flowing from the passage 21a to the passage 22a.

A return passage 32a is formed between the partition wall 32 and the partition wall 33. The return passage 32a opposes the passages 23a and 24a of the tubular passage section 20 such that the return passage 32a returns and guides the cooling water flowing from the passage 23a to the passage 24a.

A return passage 33a is formed between the partition wall 33 and the partition wall 34. The return passage 33a opposes the passages 25a and 26a of the tubular passage section 20 such that the return passage 33a returns and guides the cooling water flowing from the passage 25a to the passage 26a.

A return passage 34a is formed between the partition wall 34 and the partition wall 31. The return passage 34a opposes the passages 27a and 28a of the tubular passage section 20 such that the return passage 34a returns and guides the cooling water flowing from the passage 27a to the passage 28a.

The outer end of the cover section 30 is provided with an opening 35. The end of the motor 40 is fitted to the opening 35. In the opening 35, the end of the motor 40 and the cover section 30 are coupled so that they are kept watertight by means of an adhesive or packing or the like.

Figure 7:
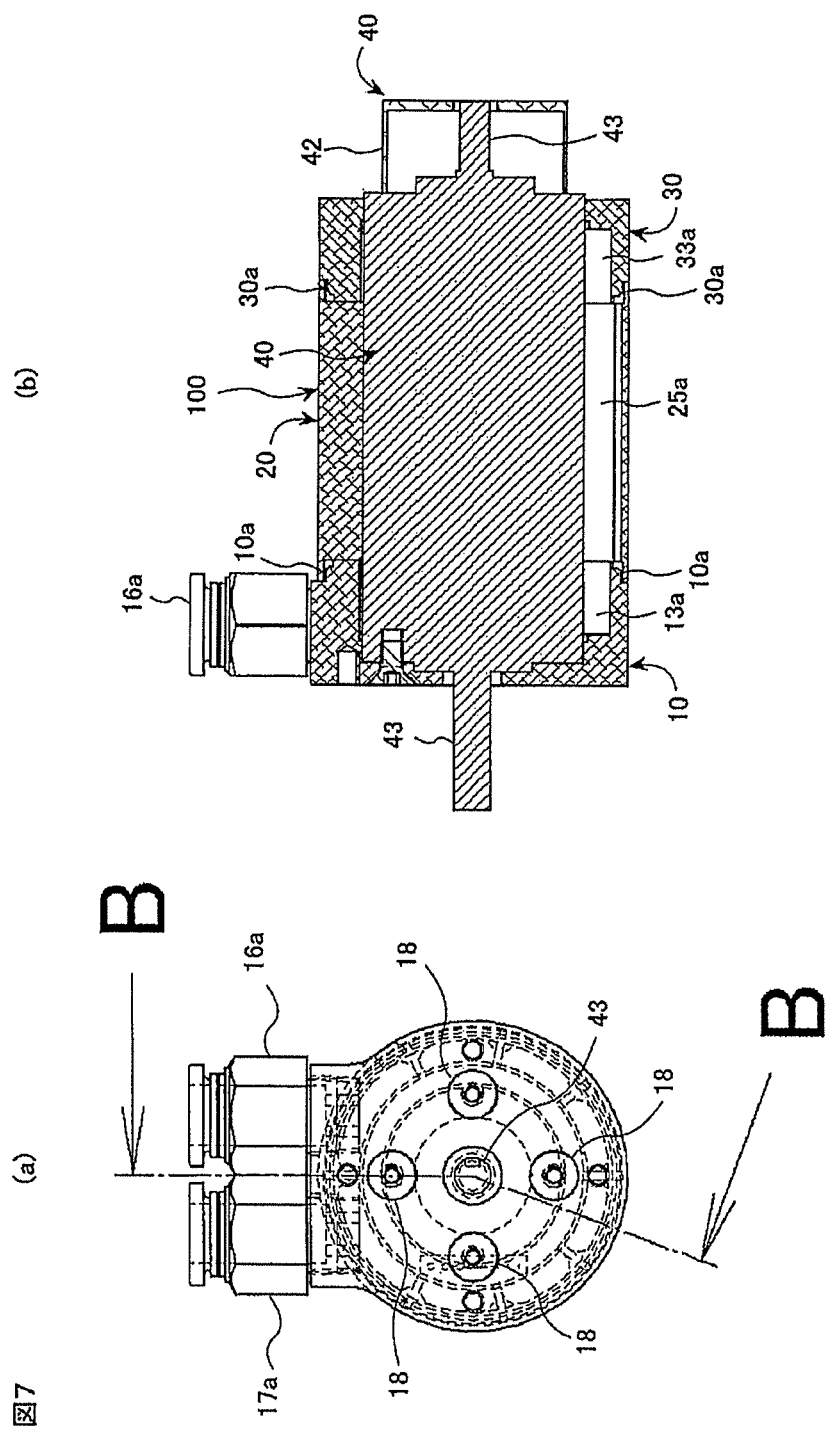
FIG. 7 shows a front view of the motor contained in the housing of the embodiment of the present invention and a cross-sectional view along arrows B-B therein.

FIGS. 7 (a) and (b) show a front view of the motor 40 contained in the housing 100 and a cross-sectional view along arrows B-B therein.

As is well shown in FIG. 7(b), the cover section 10 is coupled to the tubular passage section 20 by fitting the peripheral end of one end of the tubular passage section 20 to the shoulder 10a of the end of the cover section 10. Similarly, the cover section 30 is coupled to the tubular passage section 20 by fitting the peripheral end of the one end of the tubular passage section 20 to the shoulder 30a of the end of the cover section 30. The inner wall of the passages 13a, 25a, and 33a consists of the outer peripheral surface of the motor. This arrangement is similar to the remaining passages, the water-supply chamber 11a, and the drainage chamber 15a.

Figure 8:
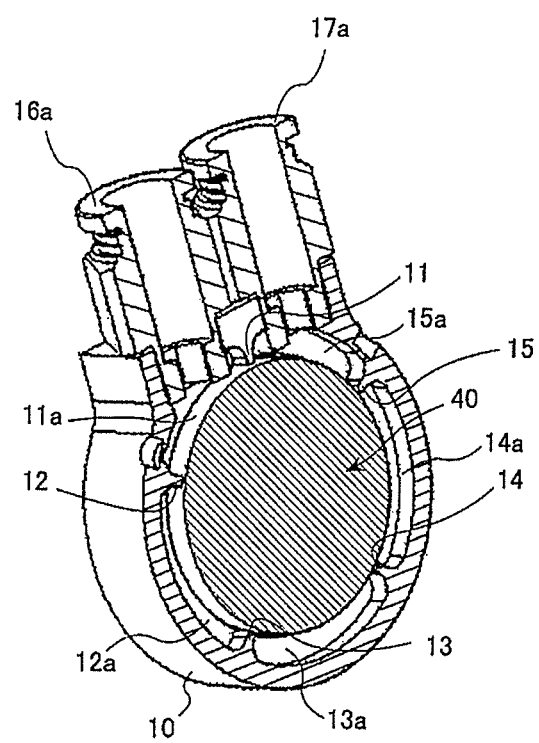
FIG. 8 is a perspective view of the first cover section of the embodiment of the present invention, wherein the first cover section is cut away by a plane orthogonal to the shaft of the motor.

FIG. 8 is a perspective view of the first cover section 10, wherein the first cover section 10 is cut away by a plane orthogonal to the shaft 43 of the motor. This cross section also illustrates cross sections of the water-supply conduit 16a and the drainage conduit 17a.

Figure 9:
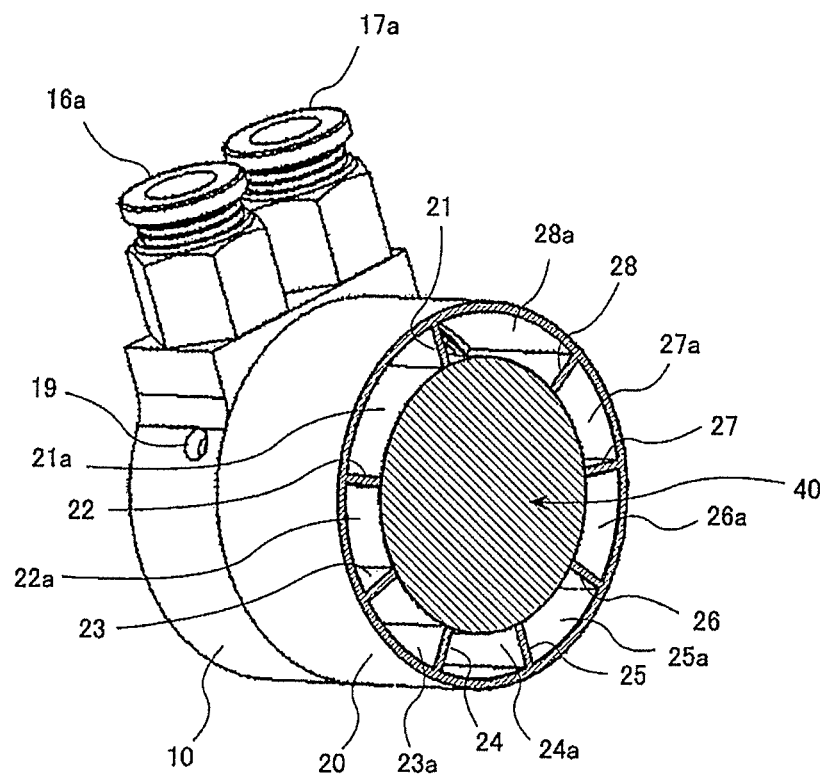
FIG. 9 is a perspective view of the water-cooled motor structure as shown in FIG. 2, in the side of the first cover section, wherein the tubular passage section is cut away by a plane orthogonal to the shaft of the motor.

FIG. 9 is a perspective view of the water-cooled motor structure as shown in FIG. 2, in the side of the cover section 10, wherein the tubular passage section 20 is cut away by a plane orthogonal to the shaft 43 of the motor. In FIG. 9 and the following figures, the motor 40, for convenience, is shown as a dark member.

Figure 10:
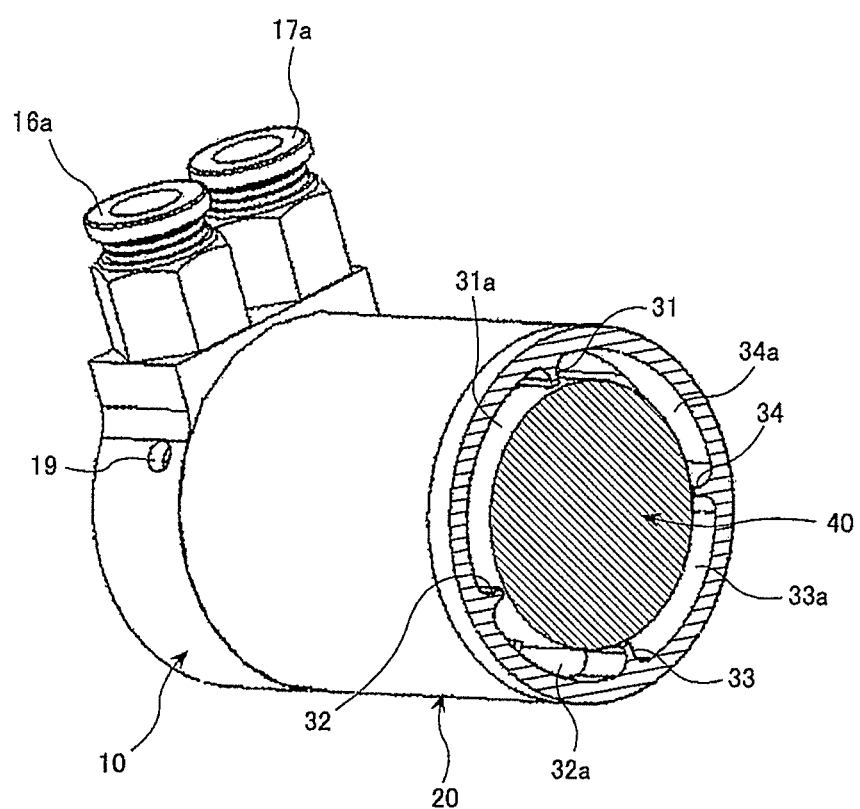
FIG. 10 is a perspective view of the water-cooled motor structure as shown in FIG. 2, in the side of the tubular passage section, wherein the second cover section is cut away by a plane orthogonal to the shaft of the motor.
Figure 11:
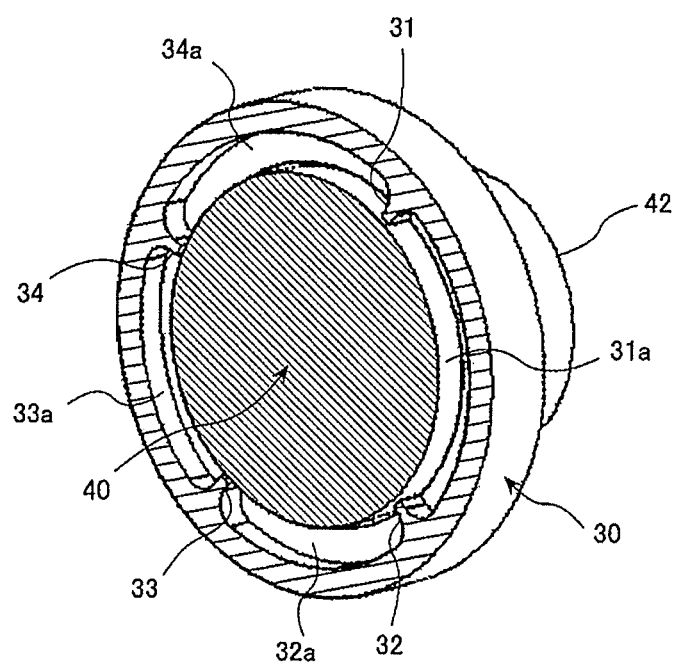
FIG. 11 is a perspective view of the second cover section that was cut away in FIG. 9, in a view from the inner side.

FIG. 10 is a perspective view of the water-cooled motor structure in FIG. 2, in the side of the tubular passage section 20, wherein the second cover section 30 is cut away by a plane orthogonal to the shaft 43 of the motor. FIG. 11 is a perspective view of the second cover section 30 that was cut away in FIG. 9, in a view from the inner side.

Figure 12:
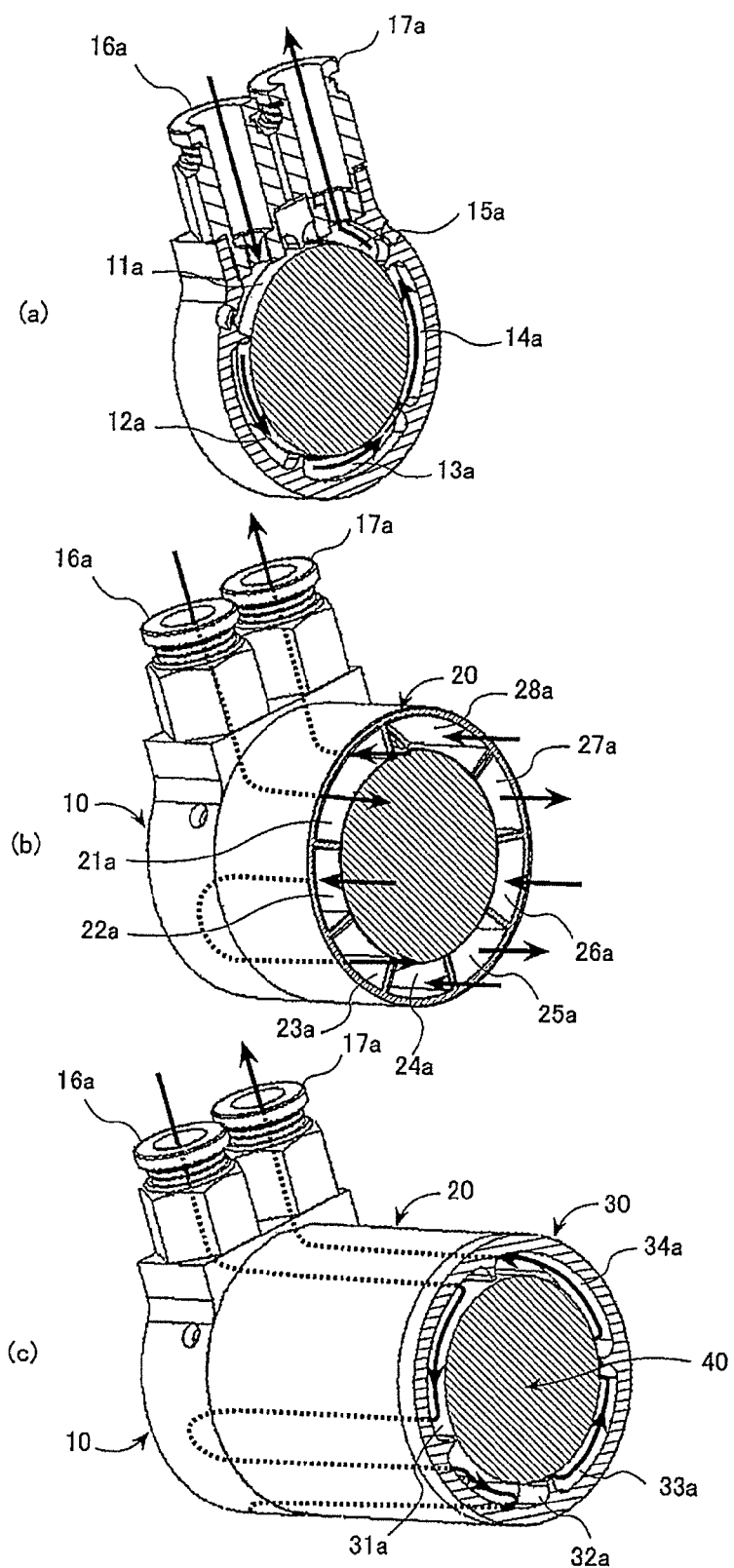
FIG. 12 illustrates the flow of the cooling water within the water-cooled motor structure corresponding to FIGS. 8, 9, and 10.

FIGS. 12(a), (b), and (c), corresponding to FIGS. 8, 9, and 10, respectively, illustrate the flow of the cooling water within the water-cooled motor structure.

The cooling water, supplied from an external water-supplying tank (not shown) flows from the water-supplying conduit 16a through the water-supply chamber 11a to the passage 21a (the inward passage) of the tubular passage section 20. The cooling water within the passage 21a arrives at the return passage 31a of the cover section 30 and is guided to the passage 22a (the outward passage) of the tubular passage section 20 therefrom.

The cooling water within the passage 22a arrives at the return passage 12a of the cover section 10 and is guided to the passage 23a (the outward passage) of the tubular passage section 20 therefrom. The cooling water within the passage 23a arrives at the return passage 32a of the cover section 30 and is guided to the passage 24a (the outward passage) of the tubular passage section 20 therefrom.

The cooling water within the passage 24a arrives at the return passage 13a of the cover section 10 and is guided to the passage 25a (the inward passage) of the tubular passage section 20 therefrom. The cooling water within the passage 25a arrives at the return passage 33a of the cover section 30 and is guided to the passage 26a (the outward passage) of the tubular passage section 20 therefrom.

The cooling water within the passage 26a arrives at the return passage 14a of the cover section 10 and is guided to the passage 27a (the inward passage) of the tubular passage section 20 therefrom. The cooling water within the passage 27a arrives at the return passage 34a of the cover section 30 and is guided to the passage 28a (the outward passage) of the tubular passage section 20 therefrom.

The cooling water within the passage 28a arrives at the drainage chamber 15a of the cover section 10 and is drained from the drainage conduit 17a. Because the drained cooling-water has absorbed heat generated from the motor and thus the temperature of it is increased, the drained cooling-water releases heat by means of a radiator (not shown) or the like, and is returned to the water-supplying tank.

The embodiment assumes an application to a motor used by a robot. For instance, in a robot to be moved, a robot wherein it is desired that it output a range of power while conserving space, a robot to work in cooperation with a human, with a rating of 80 W under the industrial guidelines, or another robot, because there is a requirement to perform a control process using a possibly compact body to achieve power as significant as possible, the present invention is useful. The present invention, however, is not limited to the application for a robot.

With the embodiment, the following significant advantages can be obtained.

(1) Because water flowing through the tubular passage section evenly sweeps over the surface of the motor, the motor can be cooled. This can provide a more efficient cooling. In particular, because the outer wall (the outer peripheral surface) of the motor in itself constitutes the inner wall of the passages, the cooling water can directly contact the motor, and thus the efficiency of the water cooling can be enhanced.

(2) Because the cross-sectional area of the passage can be freely designed, the effective cross-sectional areas of the respective passages can be made uniform. The term "effective cross sectional area" refers to a cross-sectional area that considers the resistance in the event a blockage, such as by the temperature sensor in the above embodiment, occurs midway in the passage, rather than the actual cross-sectional area. However, a temperature sensor need not be used. If used, the number of temperature sensors is not limited to a specific number.

(3) Because the inner walls of the passages utilize the outer surface of the motor and the sides of the cover sections are provided with the return passages, water can simply flow straight through the passages of the tubular passage section from the respective one ends to the respective other ends. This results in that the cross-sectional shapes of the tubular passage section being capable of being uniform at any point between the one end and the other end in the axial direction. Therefore, the configuration of the tubular passage section can be significantly simplified, the tubular passage section can be readily manufactured, and the number of components to be required can be reduced.

For instance, the tubular passage section can be manufactured with relative ease by cutting or extrusion, and so on. The tubular passage section can be manufactured by injection molding. The cover sections can also be readily manufactured by cutting or injection molding, and so on. Therefore, the manufacturing cost can be reduced.

Figure 13:
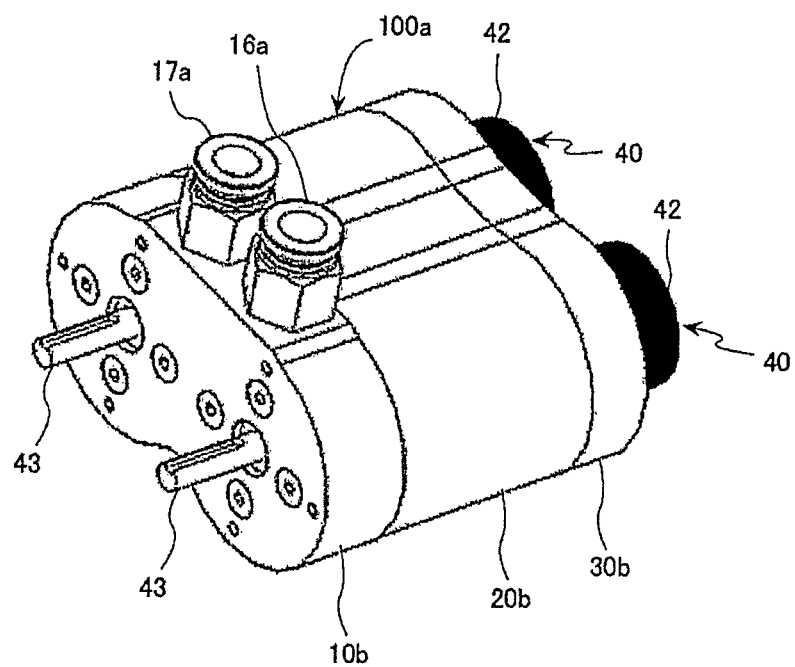
FIG. 13 shows an example of an application of the embodiment of the present invention.
Figure 14:
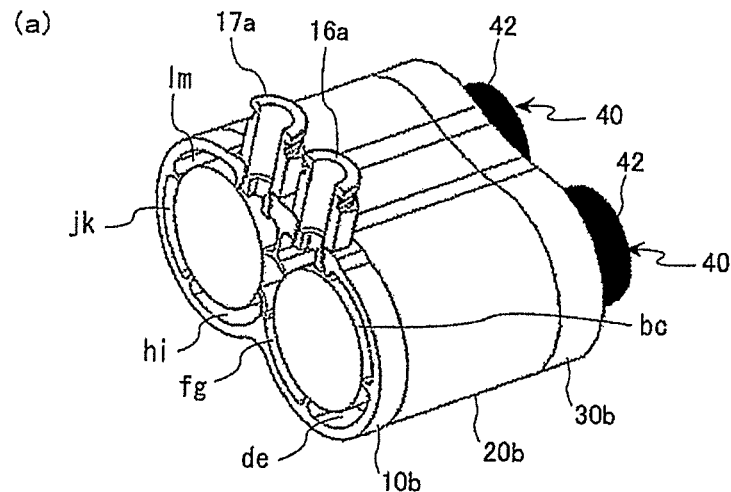
FIG. 14 illustrates perspective views, which are cut out in three portions, of the application as shown in FIG. 13.
Figure 14:
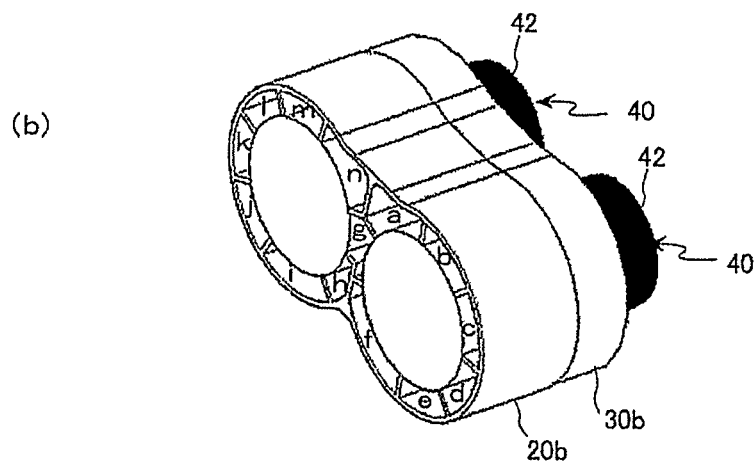
Figure 14:
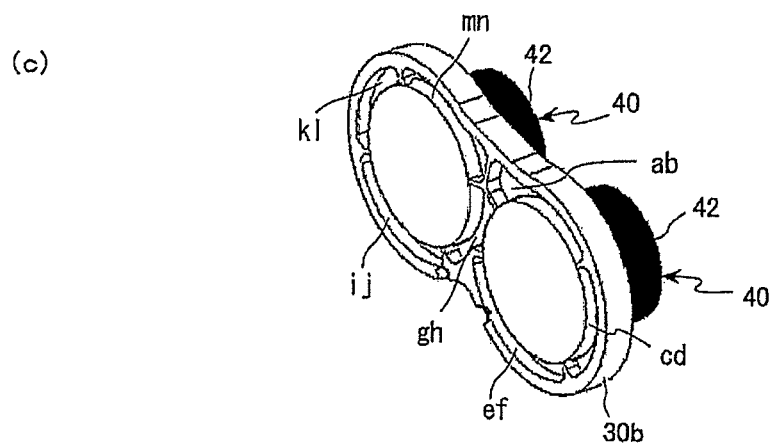

Now an applied example of the embodiment will be described in reference to FIGS. 13 and 14. FIG. 13 shows an example of the water-cooled motor structure of the applied example. FIGS. 14(a), (b), and (c) illustrate perspective views of the water-cooled motor structure, which are cut out in three portions.

In this applied example a plurality (in this example, two) of motors are contained in a single water-cooled housing. In the housing, a first cylindrical space for containing a first motor and a second cylindrical space for containing a second motor are provided in parallel. Like the above description, the housing 100a, broadly discussed, comprises a centered tubular passage section 20b, and a first cover section 10b and a second cover section 30b that are coupled to both ends of the tubular passage section. Each of the cross sections, corresponding to the respective first and second motors of these components, is substantially shaped as a pair of binoculars. However, a water-supplying conduit 16a (a water supply section) and a drainage conduit 17a (a water drain section) that are both provided on the first cover section 10b, are provided just one pair such that both motors are to be shared.

The tubular passage section 20b has a shape in which two of the substantially cylindrical tubular passage sections 20 in the above embodiment are connected in parallel. A plurality of passages a-n (outward passages and inward passages) extending parallel to each other along the central axis is provided between a plurality of partition walls and the peripheral surfaces of the respective motors. The passages a-f are for the first motor, while the passages h-n are for the second motor. The center passage g is for both the first and second motors.

The first cover section 10b is provided with return passages bc, de, fg, hi, jk, and lm. As denoted herein, each of the return passages as shown in FIG. 14 is denoted by the two characters (letters). This denotation means that the cooling water is guided from the passage denoted by the first letter to the passage denoted by the second letter. For instance, the return passage bc guides the cooling water from the passage b to the passage c. Similarly, the second cover section 30b is provided with the return passages ab, cd, ef, gh, ij, kl, and mn. In the depicted example, the passage a communicates with the water-supply section 16a, while the passage n communicates with the drainage conduit 17a.

To share the pair of the water-supply conduit 16a and the drainage conduit 17a for the first and second motors, the cooling water introduced into the water-supply conduit first flows through all the passages corresponding to the first motor, then flows through all the passages corresponding to the second motor, and then arrives at the drainage conduit 17a. To achieve this, the passages for both motors are connected in the middle portion of the housing. This connecting method may include the two following methods.

(1) One linear passage of the tubular passage section 20b is shared by the first and second motors. In the example in FIG. 14, such a one linear passage matches the passage g. The cooling water flowing through that passage contacts the outer walls of both motors. The cooling water to the first motor of the tubular passage section 20b then flows into the passage g, and then is guided to the passage of the second motor by the first cover section 10b or the second cover section 30b (in the depicted example, the second cover section 30b). The example in FIG. 14 corresponds to this configuration.

(2) The tubular passage section 20b has a passage independent from the first and second motors. The cooling water is guided to the passage of the second motor by the first cover section 10b or the second cover section 30b.

Other configurations, the operations, and the functions of the applied example are described above.

While the preferred embodiments of the present invention have been described, various modifications and permutations are possible other than the forgoing. For instance, the number of the outward passages and the inward passages are not limited to the depicted examples. While the example has both the water supply conduit and the drainage conduit provided on a single cover section, an arrangement may be possible in which one cover section is provided with the water supply conduit and another section is provided with the drainage conduit. In such an arrangement, the number of the outward passages may total one more than those of the inward passages.

BRIEF DESCRIPTION OF THE NUMERALS

10 First cover section
10a Shoulder
10b First cover section
11-15 Partition walls
11a Water supply chamber
12a, 13a, and 14a Return passages
15a Drainage chamber 16 Water-supply inlet port
16a Water-supply conduit
17 Water-drain outlet port
17a Drainage conduit
18, 19 Threaded holes
20 Tubular passage section
20b Tubular passage section
21-28 Partition walls
21a-28a Return pass ages
29 Dashed-line circle
30 Second cover section
30a Shoulder
30b Second cover section
31-34 Partition walls
31a-34a Passages
40 Motor
42 End cover
43 Rotary shaft
44, 46 Threaded holes
47 End
50 Passage
100 Housing
100a Housing
a-g Passages
ab, bc, cd, de, ef, fg, gh, hi, ij, jk, kl, lm, and mn Return passages

The invention claimed is:

1. A water-cooled motor structure comprising a water-cooled housing for containing a motor such that cooled water flows through the water-cooled housing to cool the motor, the water-cooled housing comprising:
a tubular passage section that has a plurality of partition walls erected in a direction of a central axis at prescribed angular intervals on a substantially cylindrical inner wall to form a plurality of outward passages and a plurality of inward passages extending parallel to each other along the central axis between the plurality of partition walls and an outer peripheral surface of the motor, wherein each passage of the plurality of the outward passages and the plurality of the inward passages is defined by a portion of the inner wall of the tubular passage section, a partition wall of the plurality of partition walls, and a portion of the outer peripheral surface of the motor;
a first cover section, which closes a first opening of the tubular passage section and has a plurality of return passages that connects the inward passages to following outward passages;
a second cover section, which closes a second opening of the tubular passage section while having a plurality of return passages that connects the outward passages to following inward passages;
a water supply section that is provided on the first cover section and that is connected to an entrance of a first outward passage; and
a water drain section that is connected to an outlet of a last inward passage of the first cover section or is connected to an outlet of a last outward passage of the second cover section.

2. The water-cooled motor structure of claim 1, wherein a shape of a cross section of an inner wall of the tubular passage section is uniform at any point between one end and an other end in an axial direction.

3. The water-cooled motor structure of claim 1, wherein each of the return passages that are provided with the first cover section and the second cover section include a cavity that connects two adjacent passages of the tubular passage section that is provided in an interior of a corresponding cover section.

4. The water-cooled motor structure of claim 1, wherein the first cover section that is provided with the water supply section is configured for receiving supplies and cooling-water from outside, and wherein the supplied cooling-water flows into the water-cooled housing and the water drain section that is configured for externally draining the cooling water through the water-cooled housing.

5. The water-cooled motor structure of claim 1, wherein the first cover section is provided with the water supply section configured for receiving supplies and cooling water from outside, and wherein the supplied cooling water flows into the water-cooled housing, and wherein the second cover section is provided by the water drain section that is configured for externally draining the cooling water through the water-cooled housing.

6. The water-cooled motor structure of claim 1, wherein the water-cooled housing includes a first space corresponding to a first motor and a second space corresponding to a second motor such that the first space and the second space are connected in parallel to each other;
wherein the first space and the second space share a pair of the water supply section and the water drain section; and
wherein the cooling-water supplied to the water supply section flows in a plurality of passages of the first space and then flows in a plurality of passages of the second space, and is drained from the water drain section.

7. A water-cooled housing for containing a motor such that cooling water cools the motor, the water-cooled housing comprising:
a tubular passage section that has a plurality of partition walls erected in a direction of a central axis at prescribed angular intervals on a substantially cylindrical inner wall to form a plurality of outward passages and a plurality of inward passages extending parallel to each other along the central axis between the plurality of partition walls and an outer peripheral surface of the motor, wherein each passage of the plurality of the outward passages and the plurality of the inward passages is defined by a portion of the inner wall of the tubular passage section, a partition wall of the plurality of partition walls, and a portion of the outer peripheral surface of the motor;
a first cover section, which closes a first opening of the tubular passage section while having a plurality of return passages that connects the inward passages to following outward passages;
a second cover section, which closes a second opening of the tubular passage section while having a plurality of return passages that connects the outward passages to following inward passages;
a water supply section that is provided on the first cover section and connected to an entrance of a first outward passage; and
a water drain section that is connected to an outlet of a last inward passage of the first cover section or is connected to an outlet of a last outward passage of the second cover section.

8. The water-cooled housing of claim 7, wherein a shape of a cross section of an inner wall of the tubular passage section is uniform at any point between one end and an other end in an axial direction.

9. The water-cooled housing of claim 7, wherein each of the return passages that are provided with the first cover section and the second cover section includes a cavity that connects two adjacent passages of the tubular passage section that is provided with an interior of a corresponding cover section.

10. The water-cooled motor housing of claim 7, wherein the first cover section is provided with the water supply section configured for receiving supplies and cooling water from outside, and wherein the supplied cooling-water flows into the water-cooled housing and wherein the water drain section is configured for externally draining the cooling water through the water-cooled housing.

11. The water-cooled housing of claim 7, wherein the first cover section is provided with the water supply section configured for receiving supplies and cooling-water from an exterior, and wherein the supplied cooling-water flows into the water-cooled housing, and wherein the second cover section is provided by the water drain section that is configured for externally draining the cooling water through the water-cooled housing.

12. The water-cooled housing of claim 7, wherein the water-cooled housing includes a first space corresponding to a first motor and a second space corresponding to a second motor such that the first space and the second space are connected in parallel to each other;
wherein the first space and the second space share a pair of the water supply section and the water drain section; and
wherein the cooling-water supplied to the water supply section flows into a plurality of passages of the first space and then flows into a plurality of passages of the second space, and is drained from the water drain section.

13. A water-cooled enclosure for cooling a motor comprising:
a tubular passage section that has a plurality of dividing walls extending towards a central axis of the tubular passage section forming a plurality of outward passages and a plurality of inward passages along the central axis of the passage section between the plurality of dividing walls and an outer peripheral surface of a motor;
a first cover section that closes a first end of the tubular passage section while having a plurality of return passages that connects the inward passages to following outward passages;
a water supply section connected to a first outward passage of the first cover section;
a water drain section connected to a last inward passage of the first cover section, wherein the first outward passage or last inward passage has a temperature sensor; and
a second cover section that closes a second end of the tubular passage section while having a plurality of return passages that connects the inward passages to following outward passes.

14. The water-cooled enclosure of claim 13, wherein a shape of a cross section of an inner wall of the tubular passage section is uniform at any point between one end and the other end in an axial direction.

15. The water-cooled enclosure of claim 13, wherein each of the return passages that are provided with the first cover section and the second cover section includes a cavity that connects two adjacent passages of the tubular passage section that is provided with an interior of the corresponding cover section.

16. The water-cooled enclosure of claim 13, wherein the first cover section is provided with the water supply section and is configured for receiving supplies and cooling water from outside the water-cooled enclosure, and wherein the supplied cooling-water flows into the water-cooled enclosure and wherein the water drain section is configured for externally draining the cooling water through the water-cooled enclosure.

17. The water-cooled enclosure of claim 13, wherein the first cover section is provided with the water supply section configured for receiving supplies and cooling-water from an exterior, and wherein the supplied cooling-water flows into the water-cooled enclosure, and wherein the second cover section is provided the water drain section that is configured for externally draining the cooling water through the water-cooled enclosure.

18. The water-cooled enclosure of claim 13, wherein the inward passages comprise a plurality of concave slots formed on the cylindrical inner wall that extend parallel to each other along the central axis of the cylindrical inner wall.

19. The water-cooled enclosure of claim 13, wherein a plurality of temperature sensors are positioned within the outward and inward passages.

20. The water-cooled enclosure of claim 13, wherein the water-cooled enclosure includes a first space corresponding to a first motor and a second space corresponding to a second motor such that the first space and the second space are connected in parallel to each other;
wherein the first space and the second space share a pair of the water supply section and the water drain section; and
wherein the cooling-water supplied to the water supply section flows into a plurality of passages of the first space and then flows into a plurality of passages of the second space, and is drained from the water drain section.

* * * * *